United States Patent Office 2,981,632
Patented Apr. 25, 1961

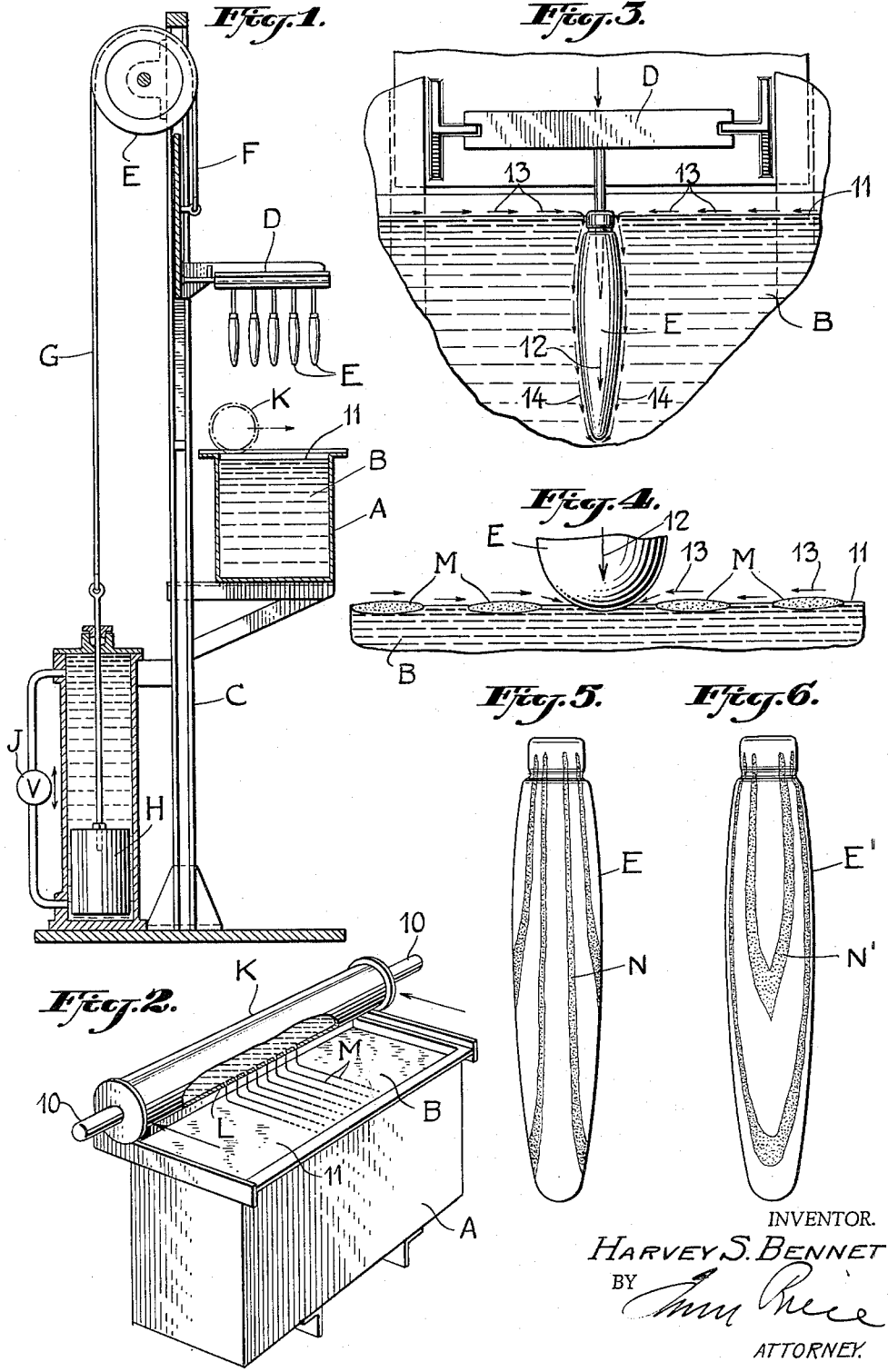

2,981,632

PROCEDURES AND COMPOSITIONS FOR PRODUCING DECORATIVE EFFECTS

Harvey S. Bennett, Basking Ridge, N.J., assignor to The Bloomfield Chemical Company, Inc., Harrison, N.J., a corporation of New Jersey Filed Mar. 7, 1957, Ser. No. 644,517

2 Claims. (Cl. 117—39)

The present invention relates to coating compositions and it particularly relates to procedures and compositions for producing decorative effects and particularly multiple color effects by dipping procedures.

In producing the color or artificial graining, it has been found that the floating of oil colors or stains upon water will not give the most satisfactory effect, since the water tends to cause blisters in the finish, and results in swelling and unevenness in many types of articles, particularly if made of wood, and also causes corrosion on steel.

Moreover, it is not possible to control the design or effect which is desired since the floating layer upon water cannot be predetermined in respect to width, depth or thickness, and there will be a wide variation, not only between the articles in each successive dip but in addition as among the very articles which may be processed in the same dipping step or operation.

Furthermore, the organic base graining material of floating oil colors or stains will become rapidly of decreased effectiveness when floated upon water because of their loss in the agitated water materials and their tendency in many cases to absorb water or become slightly emulsified or immersed into the water, with the variation increasing rapidly with time and agitation and changing greatly with temperature and humidity in the room or factory where the dip takes place.

It is among the objects of the present invention to provide a more satisfactory dipping procedure, particularly to achieve grained or contrasted color effects which will eliminate undue loss of floating oil colors or stains and which will eliminate blister swelling and corrosion which accompany the use of water as a floating agent.

Another object is to provide a dipping process for producing decorative, contrasting effects in which there will be a predeterminable uniformity of decorative effect in respect to appearance, quality and thickness, and in which the desired design may be reproduced any number of times without loss of the color or stain, as the case may be.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to the present invention, to produce the decorative effect without the use of water as a floating medium and by providing two lacquer materials of similar composition but of varying specific gravity so that the floating lacquer will float in predetermined form and configuration upon the graining lacquer.

It has been found that the best results may be achieved where the lacquers differ in specific gravity in range of 5 to 20%, with an optimum of about 10 to 12%, with the graining lacquer having a viscosity substantially greater than the floating lacquer, but of the same organic solvent composition.

In the preferred procedure, the floating lacquer is floated upon the top of the graining lacquer in the form of stripes, circular designs or other discrete separated areas.

The articles to be grained or given two-color decoration are inserted between, or even in the midst of the separated stripes, circles or other areas of the floating lacquer, which may be clear or carry a pigment or coloration distinct from the base or graining lacquer.

These articles, which for example may be handles of knives or other elongated objects, will tend to draw a film of the floating lacquer down along the sides thereof, as they are forced downwardly into the body of the bath which consists for the most part of the graining lacquer to the extent of over 90%, and desirably between 95 to 98% of the graining lacquer.

After each dipping procedure, or after two or three dipping procedures, it has been found that the design achieved by the graining lacquer will be substantially uniform in thickness, width and configuration.

Then as the design commences to weaken, the floating lacquer may be stirred into and mixed with the graining lacquer and the same configuration may then be applied to the surface of the graining lacquer and the dipping process continued.

This operation may normally be continued until the floating lacquer is taken up into the graining lacquer in excess of 10 to 20% and until the difference in viscosity will fall below 5%, whereupon the bath should be adjusted.

Normally, the floating lacquer will be a clear lacquer, which is applied in the form of stripes or other discrete designs, while the graining lacquer will be highly pigmented with gold, silver, or aluminum powders, or some other colored, finely divided, insoluble pigments or dyestuffs. However, if desired, this can be changed by reversing the pigmentation and clearness, with the floating lacquer being pigmented and the graining lacquer being clear.

It has been found most satisfactory to apply this graining process to handles which have been given a base coating so that they have a smooth finish, usually of one tone, or not more than two tones, which will result in the most striking grained effects.

In the preferred form, the design is applied by the floating lacquer to the top of the graining lacquer by means of a dispensing device having a plurality of spaced orifices which will permit the floating lacquer to be applied in a distinct discrete pattern, or in the form of stripes or in the form of circular designs on the surface of the graining lacquer as it is in quiescent condition in a tank or receptacle.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a diagrammatic view in side sections, showing how the dipping operation may be utilized to achieve the distinctive graining effects of the present invention.

Fig. 2 is a top perspective view, showing the manner in which the floating lacquer is deposited in stripes upon the graining lacquer.

Fig. 3 is a fragmentary side sectional view, diagrammatically showing the manner in which the dipping operation results in a decorative design being given to a typical elongated handle.

Fig. 4 is an enlarged view, showing part of Fig. 3 as the handle starts to penetrate the surface of the graining lacquer containing stripes or separated, elongated portions of the floating lacquer.

Figs. 5 and 6 are side elevational views, showing the grained design which is achieved as a result of the graining procedure according to the present invention.

Referring to Fig. 1, there is shown a receptacle A containing a relatively large body of graining lacquer. The receptacle A is held upon a stand C which carries a holder D for a plurality of handles E.

The handles E on the holder D are controlled by means of the pulley E, the ropes F and G and the dashpot H with the valve J which will control the movement of the handles E moving slowly downwardly into the graining vat A.

At the top of the graining vat A is shown diagrammatically a floating lacquer receptacle K having a plurality of orifices L which may be caused to deposit a series of stripes M of the floating lacquer upon the surface of the floating lacquer B.

The actual graining is indicated on the handles E and E' by the stripes N and N', the character of which may be varied, depending upon the width, size and configuration of the stripes M.

In operation, the cylindrical device K with the N handles 10 is moved across the surface 11 of the body or bath of the graining lacquer B.

These stripes, which are shown as being straight and being separated in Figs. 2 and 4, will normally stay in the position indicated without admixture with the body of the graining lacquer B for a considerable period of time.

Then, as the handles E carried by the bore or holder D are inserted downwardly, as indicated by the arrows 12, the surface stripes M will be drawn toward the handle, as indicated by the arrows 13, and will be drawn down along the sides of the handle, as indicated at 14 in Fig. 3.

Where the stripes M have a contrasting color or pigmentation to the body of the lacquer B, the stripes or graining, as indicated at N', will be formed upon the handles of Figs. 5 and 6.

This operation may be carried on for a number of times until the agitation tends to mix the floating lacquer M into the base or graining lacquer B, whereupon the entire bath may be stirred up and a new series of stripes M applied from the orifices L of the container K.

Although the floating and graining lacquers may widely vary in composition and character, so long as the predetermined difference in specific gravity is maintained, a clear graining lacquer, for example, may have the following base composition:

Example I

| | Parts |
|---|---|
| Nitrocellulose | 10 |
| Resin | 10 |
| Plasticizer | 5 |

This formulation is reduced to about 30% solids by addition of the following solvents:

Example II

| | Percent |
|---|---|
| Methyl isobutyl ketone | 30 |
| Alcohol, denatured | 12 |
| Di-isobutyl kentone | 5 |
| Toluol | 25 |
| Xylol | 18 |
| Ethyl acetate | 10 |
| | 100 |

An alternative solvent composition which may be utilized is the following:

Example III

| | Percent |
|---|---|
| Ethyl acetate | 20 |
| Methyl isobutyl ketone | 6 |
| Butyl acetate | 20 |
| Methyl amyl acetate | 6 |
| Toluol | 36 |
| Alcohol, denatured | 10 |
| Octyl alcohol | 2 |
| | 100 |

Now to prepare a typical graining lacquer, the following base may be employed:

Example IV

| | Parts |
|---|---|
| Nitrocellulose | 12 |
| Resin | 10 |
| Plasticizer | 7 |

To the basic Example IV, pigments, dyestuffs or metallic powders are added and the solids may be reduced to 40 to 42% by the addition of either of the solvent mixtures exampled in Examples II and III.

By giving the same solvent, with the solids contained varying from 5 to 20%, and desirably from 5 to 8%, the desired differences in specific gravity is achieved, which will cause the floating lacquer to remain upon the surface of the graining lacquer without appreciable movement.

To give some other graining lacquer formulations:

Example V.—Clear floating lacquer

| | Percent |
|---|---|
| Nitrocellulose | 40 |
| Alkyd resin | 40 |
| Di-octyl phthalate | 10 |
| Blown linseed oil | 10 |
| | 100 |

Reduce to 35% solids with the following solvent combination:

| | Percent |
|---|---|
| Methyl isobutyl ketone | 40 |
| Ethanol | 14 |
| Toluol | 20 |
| Xylol | 6 |
| Ethyl acetate | 20 |
| | 100 |

Example VI.—Silver graining lacquer

| | Percent |
|---|---|
| Nitrocellulose | 34.0 |
| Alkyd resin | 34.0 |
| Di-octyl phthalate | 8.5 |
| Blown linseed oil | 8.5 |
| Aluminum powder | 15.0 |
| | 100 |

Reduce to 40% solids with solvent combination from Example V.

Example VII.—Clear floating lacquer

| | Percent |
|---|---|
| Nitrocellulose | 40 |
| Alkyd resin | 25 |
| Castor oil | 15 |
| Soyabean oil | 20 |
| | 100 |

Reduce to 35% solids with the following solvent combination:

| | Percent |
|---|---|
| Butyl acetate | 25 |
| Ethyl acetate | 30 |
| Isopropyl acetate | 15 |
| Butyl alcohol | 5 |
| Xylol | 10 |
| Toluol | 15 |
| | 100 |

*Example VIII.—Walnut graining lacquer*

| | Percent |
|---|---|
| Nitrocellulose | 40 |
| Alkyd resin | 25 |
| Castor oil | 15 |
| Soyabean oil | 19 |
| Walnut dye solution | 1 |
| | 100 |

Reduce to 40% solids with the following solvent combination:

| | Percent |
|---|---|
| Butyl acetate | 25 |
| Ethyl acetate | 25 |
| Ethanol | 15 |
| Methanol | 5 |
| Diacetone alcohol | 5 |
| Xylol | 10 |
| Toluol | 15 |
| | 100 |

*Example IX.—Water white clear floating lacquer*

| | Percent |
|---|---|
| Nitrocellulose | 46 |
| Non-drying alkyd resin | 44 |
| Dioctyl phthalate | 10 |
| | 100 |

Reduce to 35% solids with the following solvent combination:

| | Percent |
|---|---|
| Ethyl acetate | 20 |
| Ethanol | 15 |
| Isopropyl acetate | 10 |
| Butyl acetate | 15 |
| Toluol | 20 |
| Xylol | 15 |
| Amyl alcohol | 5 |
| | 100 |

*Example X.—White graining lacquer*

| | Percent |
|---|---|
| Nitrocellulose | 36.8 |
| Non-drying alkyd resin | 35.2 |
| Raw castor oil | 8.2 |
| Titanium dioxide | 20.0 |
| | 100 |

Reduce to 40% solids with the solvent combination in Example IX.

*Example XI.—Tinted clear floating lacquer*

| | Percent |
|---|---|
| Nitrocellulose | 40 |
| Maleic resin | 33 |
| Alkyd resin | 15 |
| Tricresyl phosphate | 11 |
| Tinting paste | 1 |
| | 100 |

Reduce to 35% solids with the following solvent combination:

| | Percent |
|---|---|
| Methyl isobutyl ketone | 40 |
| Di-isobutyl ketone | 10 |
| Ethanol | 15 |
| Toluol | 20 |
| Xylol | 15 |
| | 100 |

*Example XII.—Brown graining lacquer*

| | Percent |
|---|---|
| Nitrocellulose | 32.0 |
| Maleic resin | 26.4 |
| Alkyd resin | 12.8 |
| Tricresyl phosphate | 8.8 |
| Iron oxide red | 5.0 |
| Iron oxide brown | 15.0 |
| | 100 |

Reduce to 40% solids with the solvent combination listed in Example XI.

*Example XIII.—Clear floating lacquer*

| | Percent |
|---|---|
| Ethyl cellulose | 90 |
| Dibutyl phthalate | 10 |
| | 100 |

Reduce to 18% solids with the following solvent combination:

| | Percent |
|---|---|
| Butyl alcohol | 5 |
| Ethanol | 5 |
| Toluol | 40 |
| Naphtha (high flash) | 20 |
| Butyl acetate | 15 |
| Ethyl acetate | 15 |
| | 100 |

*Example XIV.—Gold graining lacquer*

| | Percent |
|---|---|
| Ethyl cellulose | 72 |
| Dibutyl phthalate | 8 |
| Gold bronze powder | 20 |
| | 100 |

Reduce to 25% solids with the solvent combination in Example XIII.

All of the above percentages and parts are parts or percentages by weight.

In each example the floating lacquer has about 5 to 10% less of solids than the base or graining lacquer and generally the solvents, or the solvent combination, are substantially the same.

However, the viscosity should be quite high so that the mixture or division of one solvent by mixture into another will only take place slowly. Generally, the stripes or discrete layers of floating lacquer may have a spacing of ¼ to ½" apart, with the same width of stripe and with a thickness of about 1/64 to 1/16".

In the above examples, nitrocellulose and ethyl cellulose formulations are used. However, it is possible to use any other type of film forming materials such as combinations of the below listed materials.

Urea-formaldehyde
Melamine-formaldehyde
Alkyd
Phenolic
Cellulose acetate
Cellulose butyrate as well as other plastic or film forming materials soluble in organic solvents Some of the organic solvents which may be used are:

Xylol
Toluol
Methyl, isobutyl, and other ketones
Ethyl, butyl, propyl and amyl acetate or propionate
Ethyl, butyl, amyl, methyl or diacetone alcohol By the lacquer or lacquers as used in the specification and claims is also included varnishes, synthetic finishes or enamels. In other words, ingredients of different types may be used to permit drying not only by evaporation but also by oxidation or polymerization.

It is apparent that considerable variation is possible in the novel procedures above set forth so long as the graining lacquer has a higher specific gravity than the floating lacquer.

As many changes could be made in the above procedures and compositions for producing decorative effects, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A bath for graining elongated handles and similar articles composed of a two-layer non-aqueous floating and graining upper and lower lacquers, both being of substantially the same organic solvent composition, with the lower lacquer forming a lower graining layer forming at least 90% of the bath and the upper lacquer forming an upper floating lacquer layer constituting 2 to 5% of the bath, said floating lacquer having a specific gravity 5 to 20% less than graining lacquer and said graining lacquer containing about 5 to 20% of solids and said floating lacquer having about 5 to 10% less solids than the graning lacquer, both said lacquers being composed of nitrocellulose and a resin dissolved in a combination of ketone alcohol, toluol, and an acetate ester solvent.

2. A method of graining elongated handles and similar articles which comprises positioning the article vertically and dipping the article while held vertical into a two-layer non-aqueous graining organic solvent bath, both layers being of substantially the same organic solvent composition with the lower layer consisting of the graining lacquer forming 95 to 98% of the bath and the upper floating lacquer layer constituting 2 to 5% of the bath, said floating lacquer having a specific gravity 10 to 12% less than graining lacquer, said lacquers consisting of nitrocellulose and a resin dissolved in a combination of ketone alcohol, toluol, and an acetate ester solvent, said graining lacquer containing about 5 to 20% of solids, said floating lacquer having about 5 to 10% less solids than the graining lacquer.

References Cited in the file of this patent

UNITED STATES PATENTS

| | | |
|---|---|---|
| 1,744,781 | Witten | Sept. 2, 1930 |
| 2,118,781 | Sallada | May 24, 1938 |
| 2,373,211 | Waldie | Apr. 10, 1945 |

FOREIGN PATENTS

| | | |
|---|---|---|
| 242,900 | Great Britain | Nov. 19, 1925 |
| 406,048 | Great Britain | Feb. 22, 1934 |